June 14, 1966  P. L. HUNTER  3,256,495
STABLE FREQUENCY SQUARE WAVE INVERTER WITH VOLTAGE FEEDBACK
Filed Jan. 20, 1964
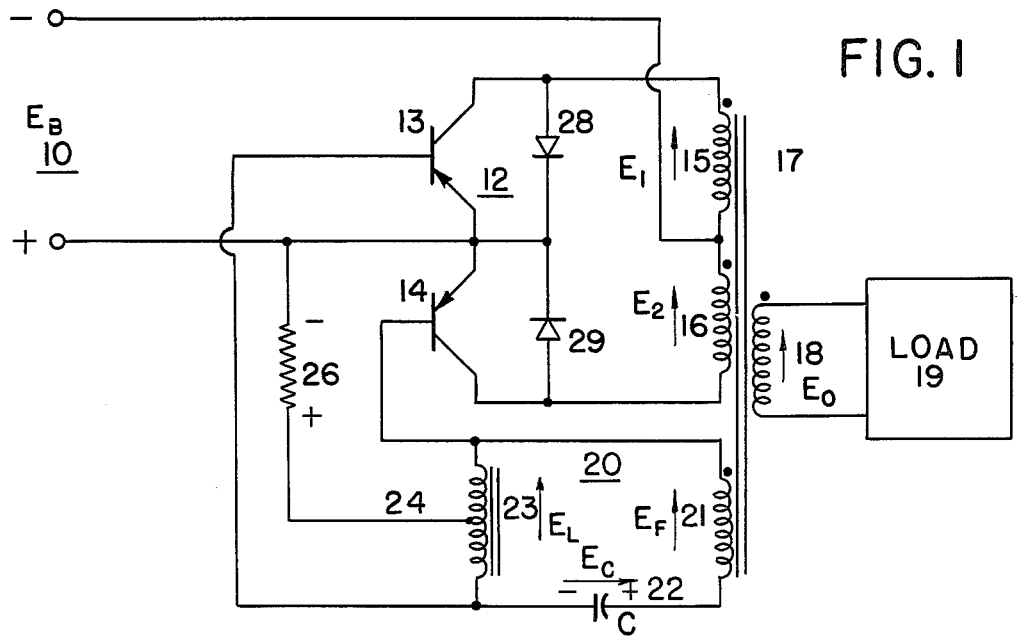
FIG. 1
FIG. 2A
VOLTAGE ACROSS
FEEDBACK WINDING 21, $E_F$
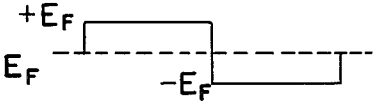
FIG. 2B
VOLTAGE ACROSS
INDUCTOR 23, $E_L$
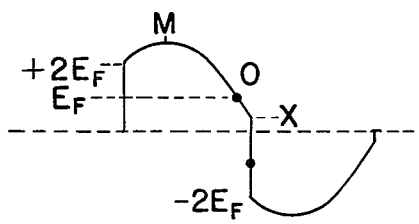
FIG. 2C
OUTPUT VOLTAGE
ACROSS WINDING 18, $E_O$
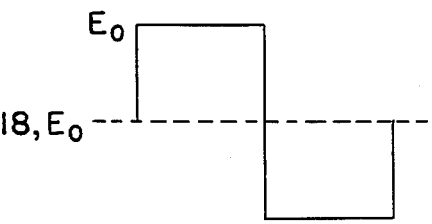
INVENTOR.
PATRICK L. HUNTER
BY *Brown Jackson Boettcher & Dienner*
ATT'YS

United States Patent Office 3,256,495
Patented June 14, 1966

3,256,495
STABLE FREQUENCY SQUARE WAVE INVERTER WITH VOLTAGE FEEDBACK
Patrick L. Hunter, Worthington, Ohio, assignor to North Electric Company, Galion, Ohio
Filed Jan. 20, 1964, Ser. No. 338,886
5 Claims. (Cl. 331—113)

The present invention relates to an electrical waveform generator circuit for providing a square wave alternating output voltage from a direct current voltage source, and specifically to an inverter circuit which provides a square wave output at a stable frequency output substantially independent of the magnitude of the input voltage and the magnitude of the load current.

In recent years there has been a rapid development of static power inverters for use in both commercial and military applications. A large number of the static power inverters which have been developed in the field utilize switching transistors or silicon controlled rectifiers to provide the desired output. Experience has shown that efficient and reliable operation of such type circuits require the provision of a relatively stable frequency drive of rectangular waveform.

More specifically, in the static inverter embodiments which utilize transistor power switches, it has been found that the switching efficiency of the power switches is substantially improved by driving the transistors with an alternating voltage having a waveshape with a fast rise and a fast fall time. Additionally, it has also been determined that operation of the transistors with waveshapes having a fast rise time and a fast fall time substantially reduces the heat dissipation problems, as well as possible malfunctions and damage to the transistor devices.

The use of a circuit having fast switching times on the voltage drives used in the inverter embodiments having silicon controlled rectifier bridges has also been found to be important. That is, in this latter type of inverter, the accomplishment of proper commutation requires that two silicon controlled rectifiers which conduct current simultaneously be gated to a conduction state with a minimum time differential. Since the gate firing characteristics of silicon controlled rectifiers vary over a wide range, a gate firing voltage with slow rise time (a wave shape with low rate of change of voltage) may result in firing the two rectifiers at different times. The resultant time differential may in turn be sufficient to cause failure in commutation.

Other circuits and switching arrangements well known in the art are similarly dependent upon the provision of a stable frequency, square-wave drive for proper operation, and it is a primary object of the present invention to provide a new and novel inverter which is capable of providing stable frequency output at improved switching speeds.

In certain known inverter embodiments provided heretofore, and generally identified as saturable core oscillators, a pair of switching transistors are alternately energized to couple a square wave over a transformer to the load, and a positive feedback drive is coupled between the transformer and the input circuits of the transistors. However, in such arrangements, the frequency of oscillation depends upon the saturating characteristics of the transformer core, and the frequency becomes a function of the line voltage and output loading as well as changes in the saturating characteristics of the transformer with temperature. In applications in which frequency variations are desired or are not of great importance, such arrangement may be satisfactory. In a number of applications, however, (a few of which are noted above), frequency stability is of concern, and it is therefore a primary object of this invention to provide a novel self-excited, inverter circuit for producing an alternating output voltage from a direct input voltage with an output voltage of rectangular waveform operating at a stable frequency which is substantially independent of the magnitude of the direct current input voltage and the magnitude of the load current.

In still other attempts in the prior art to provide an improved form of square wave inverter, a feedback circuit is provided which utilizes inductance and capacitance as frequency determining elements for the tranisistors in the oscillator circuit. In such arrangements, a number of cycles of oscillation must necessarily occur during the start interval before a steady state waveform output is achieved. If high frequency positive feedback is not provided during the entire operating period, the switching times during the transient start conditions may be very poor. It is a further object of the present invention, therefore, to provide an inverter circuit which is operative to produce a high frequency feedback for the oscillator to produce fast switching times for both starting and normally steady state operation.

In certain arrangements which have been provided heretofore in an attempt to achieve an improved inverter circuit, a control circuit including a series resonant network controls the operation of the switching devices to operate at substantially the resonating frequency of the resonant network. In such arrangement the control circuit provides waveforms of sine wave configurations to the control terminals of the switching transistors. As a result, the switching of the transistors (which is determined by the slope of the waveform at zero magnitude of the sine wave) requires a longer period of time, and the resultant circuit operates at correspondingly reduced efficiency. Further, the problems of heat dissipation and malfunction are correspondingly increased. It is yet another object of the invention, therefore, to provide an inverter circuit which has improved switching speeds during steady state oscillation, and which specifically provides a wave form to the oscillator circuit which has a fast rise and fast fall wave shape.

A feature of an arrangement which provides a wave shape in the feedback circuit having a fast rise and a fast fall is the manner in which the transistors are thereby controlled to operate at a frequency which is higher than the natural resonant frequency $1/\sqrt{LC}$ of the feedback circuit.

These and other advantages of the present invention will become apparent with reference to the following specification and accompanying drawings wherein basic embodiments of the structure are illustrated, and in which:

FIGURE 1 sets forth the novel electrical inverter circuit of the invention; and

FIGURES 2A, 2B and 2C set forth waveforms which are generated at various points in the circuit.

Referring now to FIGURE 1, the circuit there shown basically comprises a source of unidirection potential 10, having a voltage $E_B$, connected to energize a switch circuit 12 consisting of a pair of transistor switching members 13 and 14 in the provision of opposing magnetization current to a pair of input windings 15 and 16 for electromagnetic coupling means comprising an inverter transformer 17.

Each of transistors 13 and 14 may be of the type commercially available as 2N527 which includes an emitter element, base element, and collector element. The emitter elements of transistors 13 and 14 are connected to the positive terminal of source 10 and the collector elements are connected over windings 15 and 16 to the negative terminal of source 10. The source 10 in the illustrated embodiment is a 10 volt D.C. battery. The base elements of transistors 13 and 14 are connected to feedback circuit 20 in the manner described hereinafter. Diode 28 is connected across the emitter-collector elements of transistor 13, and diode 29 is connected across the emitter-collector elements of transistor 14. Diodes 28 and 29 may be of the type identified as 1N92.

An output winding 18 of transformer 17 is inductively coupled to the input windings 15 and 16 of the inverter transformer 17, and has its end terminals connected to supply current to a load 19. Transformer 17 may be of the type available from Power Equipment, Division of North Electric Company, Galion, Ohio, identified as PECO Model 6011286. The transformer windings have relative polarities shown by the conventional dot notation in FIGURE 1.

Feedback circuit 20 includes a feedback winding 21 inductively coupled to primary windings 15 and 16 of the inverter transformer 17 to supply current to an LC circuit comprising capacitor 22 in series with inductor 23 connected across winding 21. A center tap 24 on inductor 23 is connected over resistance 26 to the positive terminal of source 10. Inductor 23 may be of the type available from Power Equipment, Division of North Electric Company, Galion, Ohio, as PECO Model 6220494. Capacitor 22 is in the order of 8 microfarads. Resistance 26 is in the order of 270 ohms.

The end terminals of inductor 23 are connected to the bases of transistors 13 and 14 respectively to provide bias potentials of alternating polarity to base elements of the switching transistors 13 and 14.

In operation, with connection of the source 10 to the transistors 13 and 14 (by switch means, not shown) transistors 13 and 14 are alternately operated to a conductive and a nonconductive state, one transistor being operated to the conductive state as the other transistor is operated to the nonconductive state. Such switching action results in the application of an alternating voltage of rectangular waveform to the input windings 15 and 16 of transformer 17. If transistor 14 is in a conductive state and transistor 13 is in a nonconductive state, the primary winding 16 will have a voltage approximately equal to $E_B$ with the upper terminal negative and the lower terminal positive. Also in accordance with known transformer principles, a voltage approximately equal to voltage $-E_B$ will be induced in winding 15 with the upper terminal negative and the lower terminal positive. Voltage $-E_O$ is induced in winding 18 and voltage $-E_F$ is induced in feedback winding 21, with the upper terminal negative and the lower terminal positive in each case.

At this time the voltage drop across transistor 14 is extremely low, and transistor 14 provides induced load current. The voltage across transistor 13, however, is equal to the battery voltage plus the voltage induced across winding 15. The voltage induced in the feedback circuit 21 is coupled over feedback circuit 20 to provide forward bias current to the base-emitter elements of transistor 14 and transistor 14 is in a conductive state. Reverse bias is applied to the base-emitter elements of transistor 13 and transistor 13 is in a nonconductive state.

With a voltage $-E_F$ across feedback winding 21 (upper end $-$, lower end $+$), capacitor 22 charges toward this voltage through inductance 23 with polarity as shown in FIGURE 1. During the charging of capacitor 22, as more voltage appears across the capacitor, less voltage results across inductor 23.

As the voltage across inductor 23 approaches zero when the voltage of capacitor approaches $+E_F$, the voltage across each half of inductor 23 also approaches zero.

As the voltage across the upper half of inductance 23 decreases to almost zero as stated above, the emitter-base current of transistor 14 decreases to the point at which transistor 14 begins to cut-off, causing the current in winding 16 to decrease with resultant decrease of voltage across winding 16 whereby an increased voltage is thrown across the emitter-collector terminals of transistor 14.

Also, as a result of the decreasing voltage across winding 16, the voltage across winding 21 decreases, becoming equal to and then less than the voltage across capacitor 22 whereby the voltage across inductance 23 becomes zero and reverses with the upper end becoming positive and the lower end becoming negative.

As the upper end of inductance 23 becomes more positive than the center tap, the base of transistor 14 becomes more positive than the emitter thereof, causing transistor 14 to cut off.

Also, as the lower end of inductance 23 becomes more negative than the center tap, the base of transistor 13 becomes more negative than the emitter thereof, causing transistor 13 to conduct in the forward direction.

Thus, current flow ceases in winding 16 and an increasing current flows in winding 15 until the voltage across winding 15 is approximately $+E_B$ which causes the voltage in winding 21 to reverse, thus inducing a voltage $+E_F$ across winding 21, additive to the voltage across capacitor 22 with the upper end of winding 21 positive and the lower end negative. At this time, an induced voltage approximately $+E_B$ will be found across winding 16 and a voltage $+E_O$ across winding 18.

This switching occurs so fast due to the positive feedback circuit that a voltage equal to $+2E_F$ appears across inductance 23 very precipitately. As a result, a reverse voltage of a steep front appears across the emitter-base terminals of transistor 14 and a forward voltage appears across the emitter-base terminals of transistor 13.

This fast switching is in evidence at the steep, practically perpendicular leading edges of the waveforms as seen at the left of FIGURES 2A, 2B, and 2C. This fast switching effects efficient fast operation of transistors 13 and 14.

Thereafter, the charging of capacitor 22 continues slightly due to continued circulation of the current which was in the circuit before switching occurred, and accordingly, as shown in FIGURE 2B, the voltage across inductance 23 reaches a maximum as indicated at point M.

At this instant, charging of the capacitor 22 ceases and then current starts to flow in the opposite direction as the capacitor 22 discharges. During the period of discharge (M–O as shown in FIGURE 2B), the transistors are maintained in their relative conditions (transistor 13 conducting and transistor 14 nonconducting) and the voltage which appears across winding 15 is maintained at a constant value. At the time capacitor 22 discharges to zero (which occurs approximately at point O, FIGURE 2B), the voltage across the inductor 23 is equal to the voltage of the feedback winding alone ($E_L = E_F$) and at this point, the capacitor 22 starts charging in the reverse direction toward $-E_F$ (i.e., the right hand terminal becomes negative and the left hand terminal becomes positive).

As the voltage across the capacitor 22 approaches the value $-E_F$, thus essentially counterbalancing the voltage $+E_F$ across winding 21, the voltage across the inductor 23 approaches zero.

As the voltage across inductor 23 approaches zero, the voltage across each half of the inductor also approaches zero.

As the voltage across the lower half of inductor 23 decreases to almost zero, as stated above, the emitter-base current of transistor 13 decreases to the point at which transistor 13 begins to cut-off (point X, FIGURE 2B), causing the current in winding 15 to decrease with resultant decrease of voltage across winding 15 whereby an increased voltage is thrown across the emitter-collector terminals of transistor 13.

Also, as a result of the decreasing voltage across winding 15, the voltage across winding 21 decreases, becoming equal to and then less than the voltage across capacitor 22, whereby the voltage across inductance 23 becomes zero and reverses with the upper end becoming negative and the lower end becoming positive.

As the lower end of inductor 23 becomes more positive than the center tap, the base of transistor 13 becomes more positive than the emitter thereof, causing transistor 13 to cut-off.

Also, as the upper end of inductor 23 becomes more negative than the center tap, the base of transistor 14 becomes more negative than the emitter thereof, causing transistor 14 to conduct in the forward direction.

Thus, current flow ceases in winding 15 and an increasing current flows in winding 16 until the voltage across winding 16 is approximately $-E_B$ (lower end +, upper end —) which causes the voltage in winding 21 to reverse, thus inducing a voltage $-E_F$ across winding 21, additive to the voltage across capacitor 22 with the lower end of winding 21 positive and the upper end negative. At this time, an induced voltage approximately $-E_B$ will be found across winding 15 and a voltage $-E_O$ across winding 18.

This switching occurs so fast due to the positive feedback circuit that a voltage equal to $-2E_F$ appears across inductor 23 very precipitately whereby, very precipitately, a reverse voltage appears across the emitter-base terminals of transistor 13 and a forward voltage appears across the emitter-base terminals of transistor 14.

This fast switching is in evidence at the steep, practically perpendicular leading edges of the waveforms as seen at the beginning of the second half cycle in FIGURES 2A, 2B, and 2C. This fast switching effect efficient fast operation of transistors 13 and 14.

It will be apparent from the foregoing disclosure that this form of regenerative operation by the feedback circuit results in a wavefront having a fast rise and fast fall time which decreases the switching time of the transistors. Further, the feedback circuit provides a frequency of operation which is higher than the arrangements which utilize the sine wave control, since the period for each cycle is substantially reduced by reason of the fast rise and fast fall of the waveform. As a result, the inverter oscillates at a frequency which is higher than the natural resonant frequency $1/\sqrt{LC}$, and the current in the feedback circuit lags the fundamental frequency component of oscillation of the inverter.

It is also noted that such mode of operation prevents the occurrence of high voltages and high currents in the feedback circuit because the feedback circuit is not driven at its natural resonant frequency. Further, the very sharp leading edge of the waveform which occurs across inductance 23 and is coupled to the emitter-base elements of transistors 13 and 14, insures more efficient, rapid and reliable switching operation which would be difficult, if not impossible, to duplicate with a sine wave output to the base elements.

Of further import is the fact that the voltage change which occurs during transfer of the conductive state from one transistor to the other is immediately applied across the feedback winding 21, and in turn across inductance 23, and the control circuits of the transistors. A high-frequency feedback is thus provided which decreases the switching times of transistors 13 and 14. Such mode of operation results in excellent starting characteristics, and as a result, the full output voltage of the inverter is available immediately when the inverter circuit is connected to the direct current source 10. Stated in another manner, the switching time of the circuit is extremely fast at the end of the first half cycle of operation, a manner of operation not readily obtainable with many known prior art circuits.

Rectifiers 28 and 29 are connected, as shown, to provide a feedback path to the source 10 for lagging currents which may be generated in the load circuit 19 or feedback network 20. Lagging currents of sufficient magnitude can cause negative collector currents in the switching transistors 13 and 14 after the transistors are biased into a forward conduction state, and the rectifiers 28 and 29 pass the negative currents thus preventing high collector to emitter voltage transients.

The frequency stability with ambient temperature changes is mainly a function of the change in inductance 23 and capacitor 22. Careful selection of inductance 23 and capacitor 22 minimize such variation.

Transistor gain changes with temperature can affect the frequency slightly. If high gain transistors are used then the frequency variation due to source voltage, load, and temperature changes can be made quite small. Further, improved frequency stability can be obtained by providing more gain in the feedback loop. That is, an amplifier stage can be connected across inductance L to detect the inductor voltage and to provide sufficient gain to minimize the small frequency drifts which may result in the circuit illustrated in FIGURE 1. Such modification will result in the generation of extremely stable frequency oscillations even with substantial changes in source voltage, load current, and temperature.

Although no difficulty has been experienced in self-starting upon application of the D.C. source to the input of the circuit, a high resistance path from the negative source conductor to either or both of the bases of the transistors can be included for starting purposes if desired.

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. A waveform generator circuit arrangement comprising means for connecting the circuit to a direct current energizing source, a pair of switching members each having a collector element, a base element and an emitter element, transformer means including a core member, a pair of input windings wound on said core member, each of said input windings being connected in series with the collector-emitter elements of a different one of said switching members for connection to said source, a feedback circuit including a feedback winding wound on said core, a resonant circuit comprising inductor means having a center tap and a capacitor connected between one end of said feedback winding one end of said inductor means, resistor means connected between said center tap and said emitter elements, means connecting one end of said inductor means to one of said base elements, and means connecting the other end of said inductor means to the other one of said base elements.

2. A waveform generator circuit arrangement comprising means for connecting the circuit to a direct current energizing source, a pair of switching members, each having an output element, a control element, and a common element, transformer means including a core member, a pair of input windings wound on said core member, each of said input windings being connected in series with the output-common elements of a different one of said switching members for connection to said source, a feedback circuit including a feedback winding wound on said core, a resonant circuit comprising inductor means having a center tap, and a capacitor connected between one end of said feedback winding and one end of said inductor means, means connecting said center tap to said common elements on said switching means, means connecting one end of said inductor means to one of said control elements and means connecting the other end of said inductor means to the other one of said control elements, and resistor means connected in at least one of the connections between said inductor means and said switching member elements.

3. An inverter circuit comprising means for connecting said circuit to a direct current source, a pair of switching members, a control circuit and an output circuit for each of said switching members, electromagnetic means including a pair of input windings, means connecting the output circuits of each of said switching members to said source in series with a different one of said input windings, a feedback circuit including a feedback winding coupled to said input windings, a series resonant circuit including inductance means and a capacitor means connected in series across a feedback winding, a center tap on said inductance means, and a first control means including one end of said inductance means and said center tap for providing voltage pulses to the control circuit for one of said switching members, and a second control means including the other end of said inductor means and said center tap for providing voltage pulses to the control circuit for the other one of said switching members.

4. An inverter circuit as set forth in claim 3 in which said switching members operate at a frequency determined by the output of said feedback circuit, and in which said capacitor and inductance of said LC series resonant circuit are tuned to a natural frequency which is less than the operating frequency of said switching members.

5. A generator circuit as set forth in claim 3 in which a signal EF is induced in said feedback winding responsive to operation of one of said switching members to the conductive state, and in which said capacitor means and said inductor means are of a value to provide a signal approximately equal to $2E_F$.

References Cited by the Examiner

UNITED STATES PATENTS

| 3,026,486 | 3/1962 | Pintell | 331—113.1 |
| 3,078,422 | 2/1963 | Mills | 331—113.1 |
| 3,119,972 | 1/1964 | Fischman | 331—113.1 |
| 3,136,957 | 6/1964 | Putkovick et al. | 331—113.1 |

FOREIGN PATENTS 651,744   11/1962   Canada.

ROY LAKE, *Primary Examiner.*

JOHN KOMINSKI, *Examiner.*